United States Patent
Castellani et al.

(10) Patent No.: US 7,466,887 B2
(45) Date of Patent: *Dec. 16, 2008

(54) OPTICAL FIBER CABLE WITH DIMENSIONALLY STABLE POLYMERIC COMPONENT

(75) Inventors: Luca Castellani, Corsico (IT); Mauro Maritano, Monza (IT); Giovanni Brandi, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 280 days.

This patent is subject to a terminal disclaimer.

(21) Appl. No.: 10/478,828

(22) PCT Filed: May 21, 2002

(86) PCT No.: PCT/EP02/05536

§ 371 (c)(1),
(2), (4) Date: May 3, 2004

(87) PCT Pub. No.: WO02/097503

PCT Pub. Date: Dec. 5, 2002

(65) Prior Publication Data

US 2004/0197059 A1    Oct. 7, 2004

Related U.S. Application Data

(60) Provisional application No. 60/294,574, filed on Jun. 1, 2001.

(30) Foreign Application Priority Data

May 30, 2001    (EP) .................... 01113193

(51) Int. Cl.
*G02B 6/44* (2006.01)

(52) U.S. Cl. ............................ 385/109; 524/108

(58) Field of Classification Search ............. 524/108; 382/109; 385/109
See application file for complete search history.

(56) References Cited

U.S. PATENT DOCUMENTS

| | | | |
|---|---|---|---|
| 5,455,881 A | 10/1995 | Bosisio et al. | |
| 5,574,816 A | 11/1996 | Yang et al. | |
| 5,715,343 A | 2/1998 | Anelli et al. | |
| 5,751,880 A | 5/1998 | Gaillard | |
| 5,911,023 A | 6/1999 | Risch et al. | |
| 6,121,401 A * | 9/2000 | Yamamoto et al. | 526/348.6 |
| 6,255,399 B1 * | 7/2001 | Castellani et al. | 525/232 |

FOREIGN PATENT DOCUMENTS

| | | |
|---|---|---|
| EP | 03 39804 | 11/1989 |
| EP | 0 764 514 A1 | 3/1997 |
| EP | 0 811 864 A1 | 12/1997 |
| EP | 1 024 382 A2 | 8/2000 |
| EP | 1 063 550 A1 | 12/2000 |
| WO | WO 97/19991 | 6/1977 |
| WO | WO 99/24479 | 5/1999 |
| WO | WO 01/09658 A1 | 2/2001 |

* cited by examiner

*Primary Examiner*—Peter D Mulcahy
(74) *Attorney, Agent, or Firm*—Finnegan, Henderson, Farabow, Garrett & Dunner, L.L.P.

(57) ABSTRACT

An optical fiber cable having a polymeric component, in particular a buffer tube, suitable for both terrestrial and undersea uses. The polymeric material forming the component has a copolymer of propylene with a $C_4$-$C_8$ α-olefin and preferably a nucleating agent disbursed therein. The obtained component shows improved dimensional stability, which guarantees its non-deformability, and high transparency and can be extruded at lower extrusion temperatures.

31 Claims, 2 Drawing Sheets

OPTICAL FIBER CABLE WITH DIMENSIONALLY STABLE POLYMERIC COMPONENT

CROSS REFERENCE TO RELATED APPLICATIONS

This application is a national phase application based on PCT/EP02/105536, filed May 21, 2002, the content of which is incorporated herein by reference, and claims the priority of European Patent Application No. 01113193.5, filed May 30, 2001, the content of which is incorporated herein by reference, and claims the benefit of U.S. Provisional Application No. 60/294,574, filed Jun. 1, 2001, the content of which is incorporated herein by reference.

BACKGROUND OF THE INVENTION

1. Field of the Invention

The invention relates to an optical fiber cable comprising a component of polymeric material having, in particular, an improved dimensional stability and to said optical fiber cable component. More in particular, said cable component is preferably in the form of a tube of polymeric material comprising at least one optical fiber housed therein.

2. Description of the Related Art

As mentioned in U.S. Pat. No. 5,911,023, in designing the cable structure, it is important to ensure that process or construction induced stresses related to cable production do not interfere with optical fiber performance. For extruded components, such as buffer tubes containing optical fibers, poor flexibility, compression-tension resistance and thermal expansion properties may result in an overall reduced efficiency of the optical fibers and residual stress in the finished product.

According to the above cited patent, while fiber optic buffer tubes have been primarily made from engineering resins (such as polybutylen-terephtalate (PBT), polycarbonate, polyamides), the use of polyolefin buffer tubes have become increasingly attractive.

For instance, U.S. Pat. No. 5,574,816 discloses a buffer tube for an optical fiber cable made from a propylene-ethylene copolymer resin having nucleating agents and filler materials disbursed therein. The nucleating agents and filler materials improve compression-tension resistance and thermal expansion properties of the polypropylene-polyethylene buffer tube; further, a low shrinkage, without negatively affecting flexibility and cost, is observed. Examples of materials suitable for realising the buffer tubes are Stamylan 83E10N, a polypropylene resin produced by DSM Engineering Plastics of Geleen, The Netherlands, having approximately 11 weight percent polyethylene and 0.4 weight percent talc nucleating agent.

The above cited U.S. Pat. No. 5,911,023 discloses optical fiber components, such as a buffer tube, a polymeric jacket or a slotted core, made of a thermoplastic polyolefin, preferably a propylene or ethylene homopolymer or a propylene-ethylene copolymer, characterized by a Melt Flow Index (MFI) higher than 3 and wherein a nucleating agent is disbursed therein, which result in substantial improvements in buffer tube crystallinity and crystallization rates, as well as reduced post extrusion shrinkage and improved crush resistance, gel compatibility and fiber length control.

U.S. Pat. No. 5,751,880 relates to an optical unit for an optical fiber telecommunications cable, the unit comprising a tube of plastics material, preferably polyethylene, polypropylene or polyvinyl chloride, having a modulus of elasticity less than 1500 MPa at 20° C. and a stress/elongation curve without a yield point. The proposed materials provide flexible and elastic tubes for the optical fiber unit, thereby making handling thereof easier. Because of its flexibility, the optical unit has greatly reduced "memory" thereby facilitating splicing operations on stranded loose tube structure cables.

EP-A-1,024,382 discloses a telecommunications cable element having a transmission element disposed in a buffer tube made from thermoplastic polyolefin elastomeric buffer material, preferably a propylene-ethylene copolymer, having a modulus of elasticity below about 500 MPa at room temperature and below about 1500 MPa at –40° C. Preferably, the polyolefin has an elongation at break below about 500% and an MFI above about 3. Flexibility of the elastomeric material is maintained over a wide range of temperature; further, its compatibility with low cost, thixotropic, water-blocking gel filling materials is observed.

International patent application publ. No. WO 01/09658 discloses a submarine optical cable comprising a polymeric buffer tube, specifically a polyester, e.g. polybutyleneterephtalate, a polyolefin, e.g. an ethylene or propylene homopolymer or an ethylene-propylene copolymer, or a polyamide, and a substantially non-deformable and hermetic elongated hollow body wherein at least one reinforcing element longitudinally extending along the whole length of the tube is embedded in the peripheral wall of said buffer tube.

The Applicant has however observed that the polyolefin materials used heretofore for manufacturing the optical buffer tubes may cause undesirable variations in the shape of the extruded buffer tubes. In particular, it has been observed that it may result difficult to maintain the desired substantially circular shape of the extruded buffer tube. After extrusion, the buffer tube is in fact subjected to a cooling step, typically by passing the tube along a water-cooling trough. As observed by the Applicant, a possible non-homogeneous (or differential) cooling of the tube (e.g. because of a variation in the thickness of the tube walls or because of the different temperatures between the polymeric melt forming the tube and the filling material and/or optical fibers contained therein), may determine an unwanted and uncontrollable variation of the desired shape of the tube. While this shape variation may be caused on any extruded component of an optical fiber cable which is subjected to a differential cooling, it becomes much more apparent when said element is a buffer tube, particularly having a non-symmetric design, for instance a buffer tube having a single strength member embedded into the peripheral wall of the buffer tube, such as the one disclosed in the above cited WO 01/09658.

SUMMARY OF THE INVENTION

The Applicant has now found that by selecting a suitable polyolefin material, in particular a copolymer of polypropylene with a $C_4$-$C_8$ α-olefin, it is possible to avoid or at least substantially reduce the above shape variations of the extruded component, in particular of a buffer tube containing optical fibers.

As used herein and for the purposes of the present invention, the term "optical fiber cable component" or "(extruded) component of an optical fiber cable" is referred to any conventional component which may advantageously be manufactured by using a polymeric material as above defined. Preferably, these components have at least one reinforcing element or strength member embedded therein. Preferably, these components are apt to receive and house at least one optical fiber therein. The term may thus comprise polymeric outer sheaths of optical cables or any intermediate polymeric sheath disposed to surround an inner structure of an optical fiber cable, preferably those wherein at least one reinforcing longitudinal element (such as a steel wire or a fiber glass rod) is disposed therein. Preferably, said term is referred to those components designed for housing optical fibers therein, such as a so-called "slotted core" or more preferably a buffer tube. Preferably said buffer tube is centrally disposed within a cable structure and more preferably it comprises at least one longitudinal reinforcing element embedded into its peripheral wall.

As observed by the Applicant, the above copolymer has the further advantages of being extrudable at relatively lower temperatures and of resulting in a component which has improved transparency with respect to the conventional polyolefins employed in the art.

A lower extrusion temperature of the material allows, for instance, a reduced shrinkage of a jelly-like filler disposed within a tube made from said material, with consequent improved filling of said tube. On the other side, an improved transparency of a component, in particular of a buffer tube made from said material, may allow an easier visual detection of the different optical fibers housed therein as well as an easier visual determination of the amount of filling material contained therein.

According to a first aspect, the present invention relates to an optical fiber cable comprising a cable component wherein the cable component is made of a polymeric material comprising a crystalline random copolymer of propylene with at least one $C_4$-$C_8$ α-olefin.

In particular, said polymeric material is a thermoplastic material. Preferably, said cable component is substantially made of said copolymer.

According to a preferred embodiment, said cable component is a buffer tube defined by a peripheral polymeric wall and containing at least one optical fiber housed therein. Preferably, a longitudinal reinforcing element is embedded in said peripheral wall of said buffer tube.

According to another aspect, the present invention relates to an optical fiber cable component made of a polymeric material comprising a crystalline random copolymer of propylene with at least one $C_4$-$C_8$ α-olefin.

In the present specification, the term "$C_4$-$C_8$ α-olefin" means an olefin of formula $CH_2$=$CH$—$R$, where R is a linear or branched alkyl containing 2 to 6 carbon atoms. The α-olefin can be selected for example from 1-butene, 1-pentene, 3-methyl-1-butene, 4-methyl-1-pentene, 1-hexene, 3,4-dimethyl-1-butene, 1-octene, and the like or a mixture thereof. 1-butene is particularly preferred for implementing the invention.

Preferably, the copolymer contains from about 1% to about 12%, more preferably from about 4% to about 10% by weight of $C_4$-$C_8$ α-olefin, with respect to the total weight of the copolymer.

According to a preferred embodiment a nucleating agent is disbursed into the polymeric material.

The nucleating agent is preferably in the range of 0.05% to 1%, particularly 0.1% to 0.5% by weight, with respect to the total weight of the copolymer.

Preferably, said nucleating agents are inorganic materials, D-sorbitol derivatives, salts of aliphatic monobasic or dibasic acids, aralkyl acids, or alkali metal or aluminum salts of aromatic or alicyclic carboxylic acids, talc, or a mixture thereof and the like. D-sorbitol derivatives are preferred.

Extruded optical fiber components, in particular buffer tubes made of the above defined polymeric material, preferably in combination with the above nucleating agents, revealed advantageous dimensional stability properties. The Applicant indeed observed that a buffer tube according to the invention shows an improved dimensional stability, in particular upon cooling after extrusion. Dimensional stability of the tube means that the tube maintains its substantially circular shape, in particular when it is cooled after being extruded.

As explained in detail in the following of the description, for helping the tube to maintain its circular shape, the tube is preferably cooled, in particular into a water bath under negative pressure. The higher the vacuum to be applied, the higher the tendency to deformation of the tube. Preferred materials are thus those which allow to extrude a tube of substantially circular shape by applying the lowest possible vacuum.

A cable component comprising a copolymer as above defined further shows a transparency higher than those ones made of the conventional polyolefin materials, the transmittance of the polymeric material forming said component being of above 70%, preferably of above 80%, measured on a 1 mm thickness layer of said material.

A further advantage obtainable when manufacturing an optical fiber cable according to the invention stands in the possibility to adopt process temperatures lower than the ones used with the conventional polyolefin materials.

The peculiar characteristics of the optical fiber cable component of the invention make it suitable for both terrestrial and undersea uses. Particularly, wishing to realise an undersea optical fiber cable comprising a central buffer tube, it is preferred to realise a cable with a buffer tube having a reinforcing element such as the buffer tube described in the above cited WO 01/09658, incorporated herein for reference.

The buffer tube disclosed in the preferred embodiment of said WO 01/09658 is centrally disposed and aligned with the central axis of the optical fiber cable; substantially because of the presence of said reinforcing element, commonly a steel wire embedded into the wall of the tube, the optical fiber cable presents a peripheral wall having a variable thickness.

Possible deformations of said tube upon cooling after extrusion can thus be avoided by using a polymeric material according to the present invention for manufacturing the above buffer tube.

BRIEF DESCRIPTION OF THE DRAWINGS

For a better comprehension of the invention, the following drawings are given.

DETAILED DESCRIPTION OF THE INVENTION

Figure 1:
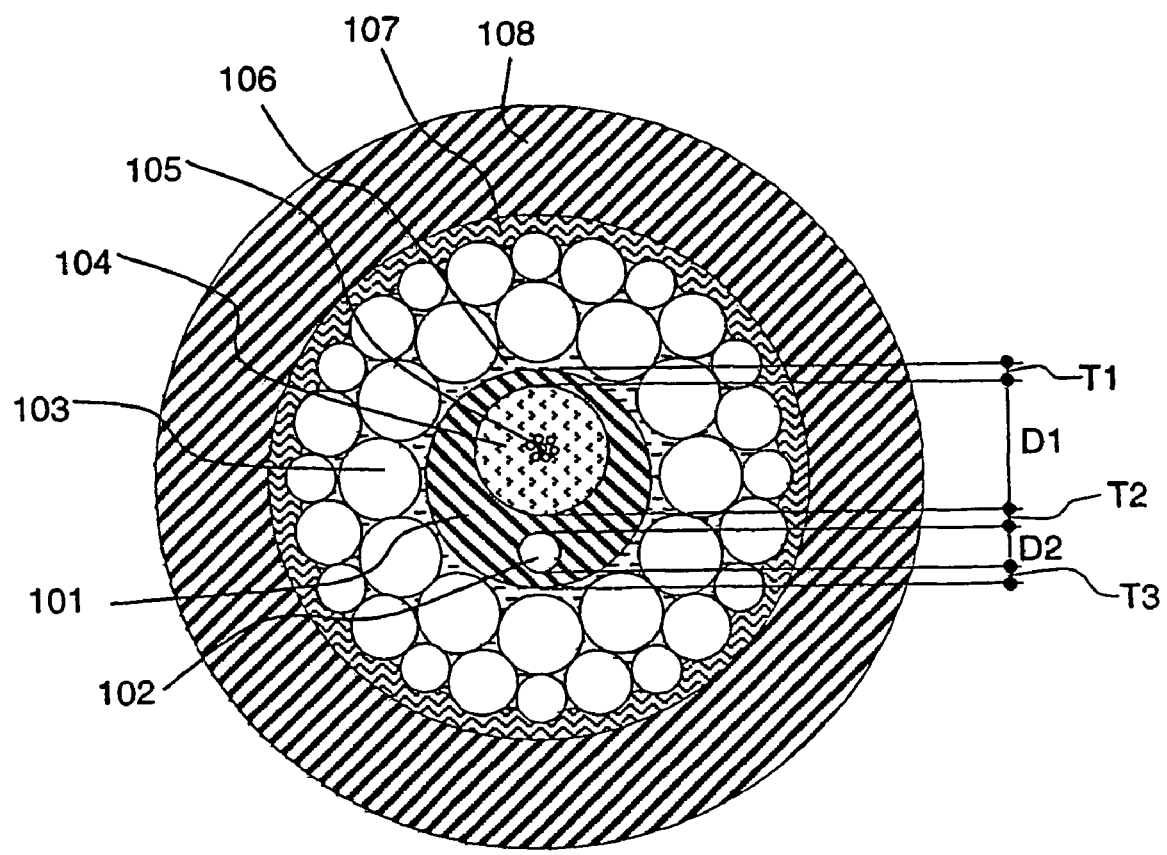
FIG. 1 is a cross-sectional view of a cable according to the invention.

As mentioned before, the present invention relates to an optical fiber cable component and to an optical fiber cable comprising said component, wherein said component is made of a polymeric material comprising a crystalline random copolymer of propylene with at least one $C_4$-$C_8$ α-olefin, as above defined, preferably with a nucleating agent, as above defined, disbursed therein.

The α-olefin of formula $CH_2$=$CH$—$R$, where R is a linear or branched alkyl containing 2 to 6 carbon atoms, can be selected for example from 1-butene, 1-pentene, 3-methyl-1-butene, 4-methyl-1-pentene, 1-hexene, 3,4-dimethyl-1-butene, 1-octene, and the like and the combinations thereof, 1-butene being particularly preferred.

Preferably, the copolymer contains from about 1% to about 12%, more preferably from about 4% to about 10% by weight of the $C_4$-$C_8$ α-olefin, with respect to the total weight of the copolymer.

Said copolymer preferably has a melting point of from about 140° C. to about 156° C.; preferably, its crystallization point is from about 90° C. to 120° C., both measured by DSC (Differential Scanning Calorimetry) at a temperature variation of 10° C./min.

The content of fractions insoluble in xylene at 25° C. is preferably higher that about 93%, more preferably higher than about 95%.

Examples of commercial copolymers suitable for manufacturing an optical fiber component according to the present invention are propylene-butene random copolymers sold by Montell under the tradenames Clyrell® or Moplen®, in particular Clyrell 721 RCXP, Clyrell 831 RCXP or Moplen Ultra 925 RCXP.

Preferably, said copolymer has a Melt Flow Index (MFI) in the range from 1 to 15, more preferably from 1 to 10 g/10 min, measured at 190° C. (ASTM 1238).

The above polymeric material comprised into said component should have a sufficiently high flexural modulus (method ISO 178) in order to impart the desired protection to the optical fibers housed therein. Preferably, said modulus is of at least about 500 MPa, preferably at least 800 MPa or higher. Said modulus is however preferably not too high, e.g. below about 1500 MPa, in order to avoid an excessive stiffness of the cable component.

Preferably, said random copolymer of propylene containing at least one $C_4$-$C_8$ α-olefin is used in the pure state. The polymeric portion of a buffer tube according to the invention can advantageously be made entirely from said propylene copolymer.

Alternatively, the random copolymer of propylene containing at least one $C_4$-$C_8$ α-olefin can be used in admixture with at least a second olefin polymer, such as propylene homopolymer or crystalline propylene copolymer containing from 1% to 3% by weight of ethylene. The amount of said second olefin polymer, when present, can be in the range of from about 10% to about 40%, preferably from about 10% to about 30%, with respect to the total weight of the copolymer of propylene containing at least one $C_4$-$C_8$ α-olefin.

As above mentioned, a nucleating agent, particularly in the range of 0.05% to 1%, more particularly 0.1% to 0.5% by weight, with respect to the total weight of the copolymer, is preferably disbursed into the polymeric material in order to further increase the dimensional stability of the optical fiber cable component. Whichever nucleating agent known in the field can be used for realising the cable of the invention. Examples of suitable nucleating agents are inorganic materials, D-sorbitol derivatives, salts of aliphatic monobasic or dibasic acids, aralkyl acids, or alkali metal or aluminum salts of aromatic or alicyclic carboxylic acids, talc or a mixture thereof, and the like. D-sorbitol derivatives are preferred, which allow to obtain increased transparency of the product. Particularly preferred is a D-sorbitol derivative of the following formula:

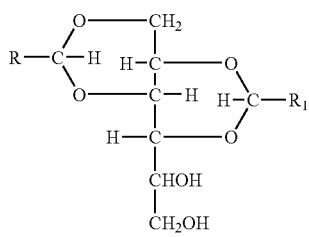

wherein R and $R_1$ are independently a

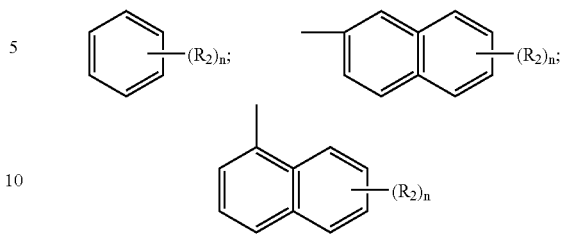

group, wherein $R_2$ represents a $C_1$-$C_6$ alkyl or alkoxy group and n is 1, 2 or 3. The above D-sorbitol derivatives, wherein R and $R_1$ are a

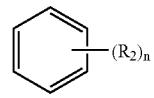

group, $R_2$ being a $C_1$-$C_6$ alkyl group and n being 1, 2 or 3, are the most preferred.

As mentioned before, the optical fiber cable component according to the invention is preferably a buffer tube containing at least one optical fiber housed therein.

FIG. 1 shows a preferred embodiment of a cable according to the invention, in particular of the submarine type, wherein a single polymeric buffer tube, comprising a reinforcing element (102) is centrally disposed within a layer of metallic wires (103), according to the cable disclosed in WO 01/09658.

According to the invention, said buffer tube is made of a polymeric material comprising a crystalline random copolymer of propylene with at least one $C_4$-$C_8$ α-olefin, as above defined, preferably with a nucleating agent, as above defined, disbursed therein.

The buffer tube (101) according to the preferred embodiment of FIG. 1 preferably has an outer diameter of from about 2.0 mm to about 6.0 mm, more preferably of from about 2.5 mm to about 4.0 mm. The tubular passage (104), wherein optical fibers (105) are housed, preferably has a diameter (D1) of from about 1.0 mm to about 4.5 mm, more preferably of about 1.2 mm to about 3.0 mm.

The optical fibers can be, for example, multi-mode fibers, single-mode fibers, such as standard single-mode fibers, dispersion-shifted (DS) fibers, non-zero dispersion (NZD) fibers, or fibers with a large effective area and the like, depending on the application requirements of the cable. Combinations of the above fibers in different sections of the cable can also be used.

The thickness of the peripheral wall of such buffer tube may vary from a maximum of e.g. about 1.5 mm in correspondence with the portion embedding the strength member, to a minimum of e.g. about 0.2 in correspondence with the diametrically opposed portion. Said thickness will depend, among other variables, from the elastic modulus of the material and from the outer diameter of the tube, in order to protect the fibers during the manufacturing process and the cable installation. Preferably, the thickness (T1) of the buffer tube is of from about 0.2 mm to about 0.6 mm, more preferably of about 0.3 mm. Preferably, also the distance (T2), between the tubular passage 104 and the reinforcing element (102), and the distance (T3), between the reinforcing element and the outer surface of the buffer tube, will have a similar thickness.

The reinforcing element (102), can be made of metal (e.g. steel), glass reinforced plastic, aramid fibers reinforced plastic, carbon fibers reinforced plastic or boron fibers reinforced plastic. Preferably said reinforcing element is a steel wire. The diameter D2 of said reinforcing element can be from about 0.3 mm to about 0.8 mm, depending on the dimensions of the buffer tube, preferably of from about 0.4 mm to about 0.65 mm. According to a preferred embodiment, the material employed for such reinforcing element is steel, having a Young modulus of about 180.000-200.000 MPa.

For instance, with reference to FIG. 1, a buffer tube 101 can be made of a propylene-butene copolymer having an elastic modulus of about 950-1100 (method ISO 178). Said tube may have an outer diameter of about 3.5 mm, a thickness T1 of about 0.3 mm, a tubular passage diameter D1 of about 2.1 mm and a steel wire reinforcing element with a diameter D2 of 0.5 mm. Thickness T2 and T3 can both be of about 0.3 mm and the total thickness of the portion of peripheral wall embedding said strength member will thus be of about 1.1 mm.

A number of optical fibers (105) is housed inside the buffer tube (104), said optical fibers being immersed in a jelly-like filler. The fibers are housed within the buffer with an excess length of from about 0% to about 0.1%.

Suitable jelly-like materials for filling the buffer tube (104) typically comprise a base oil, preferably of the synthetic type, particularly those showing good compatibility with olefin polymeric materials (i.e. which do not cause any substantial modification of the physicochemical and mechanical properties of the polymeric material contacted therewith). Suitable synthetic oils showing good compatibility with olefin polymeric materials can be selected among silicon oils, polyalphaolefin oils or poly-internal olefin oils. The filler composition may contain a thickening/thixotropic agent, such as silanized pyrogenic silica. The composition may alternatively or in addition contain a "viscosity improver" such as an elastomeric polymer with a low glass transition point, which by increasing the viscosity of the solution improves its performance as a filling material. Typically, said compositions may further contain an antioxidant. Examples of such filler composition are disclosed, for instance; in U.S. Pat. No. 5,455,881 or in EP-A-811,864. Such jelly-like filler should have a viscosity sufficiently low to be easily introduced into the buffer tubes during the manufacturing process and to allow a substantially free relative movement of the fibers inside the tube. Examples of jelly-like materials suitable for being used as water-blocking filler inside the above buffer tubes are compound K550® (Huber Group) or H55® (SICPA).

A layer of metallic wires (103) is then disposed in a helical lay around the buffer tube and presents the characteristics of an arch for withstanding pressure. In particular, as shown in FIG. 1, metallic wires of different diameter can advantageously be disposed in a double helical lay according to the so-called Warrington structure. The outer surface of the buffer tube can be in contact with the surface of the metallic wires or, preferably, as shown in FIG. 1, a small gap of e.g. about 0.1-0.2 mm is left between said two surfaces. The metallic wires are typically made of steel. The outer diameter of the double helical lay of metallic wires can be of about 7-9 mm.

A suitable water-blocking material is discontinuously disposed in the interstices (106) between the outer surface of the buffer tube and the metal wires and in between the metal wires. Preferably, the elastomeric filling material is a water-blocking hydrophobic elastomer, such as a polyurethane resin.

The filling of the interstices is preferably accomplished in a discontinuous manner, in such a way that from about 10% to about 80%, preferably from about 20% to about 60% of the total length of the cavity is left free from the filler. For instance, a discontinuous filling can be accomplished by completely filling a number of longitudinal portions of the cavity with the water-blocking material, each of said filled portions being separated by the subsequent filled portion by a portion substantially free from said filling material. For instance the filling material can be disposed in said cavity by filling lengths of from about 10 to about 50 m of said cavity, followed by similar length portions free from said material.

An example of commercially available water-blocking material is "D ENCAPSULANT" (CasChem).

The cavity can thus be filled, for instance, by about 30 meters with said elastomeric composition, the subsequent 20 meters of the cavity being then left free from the filling material, the further subsequent 30 meters being filled with the filling material, the further subsequent 20 meters being left free, the further subsequent 30 meters being filled again with the elastomeric material and so on.

A tubular metal sheath (107) (e.g. of copper or aluminum) is then formed around the helical lay of metal wires. The thickness of the metal sheath is comprised between about 0.4 mm to about 0.8 mm, depending on the specific electrical resistance required for the cable as described in WO 01/09658. An outer polymeric sheath (108) is then disposed to surround formed metallic sheath. Said protective sheath has a thickness of e.g. 2.5-6 mm, preferably of from about 3 to about 5 mm, and can be advantageously made of polyethylene (e.g. high density—HDPE- or medium density—MDPE-polyethylene).

The cable according to FIG. 1 can be typically manufactured in three separate stages, as described in WO 01/09658 herein incorporated by reference as far as manufacturing is concerned. First the polymeric buffer tube with the optical fibers immersed into the filling material is manufactured by extrusion and wound on a take-up bobbin. The second stage of the manufacturing process comprises disposing the helical lay of the metal wires surrounding the buffer tube, together with the provision of the filling material in the desired interstices, and disposing the metal sheath around the metal wires. The third stage (which can also be done on-line after the second stage), comprises the extrusion of the outer polymeric protective sheath.

According to the invention, the Applicant has found that the use of the above mentioned $C_4$-$C_8$ α-olefin containing propylene copolymer results in an improved control of the process parameters and of the geometrical features of the buffer tube during the manufacturing process, as well as in an improved transparence of the final product.

Figure 2:
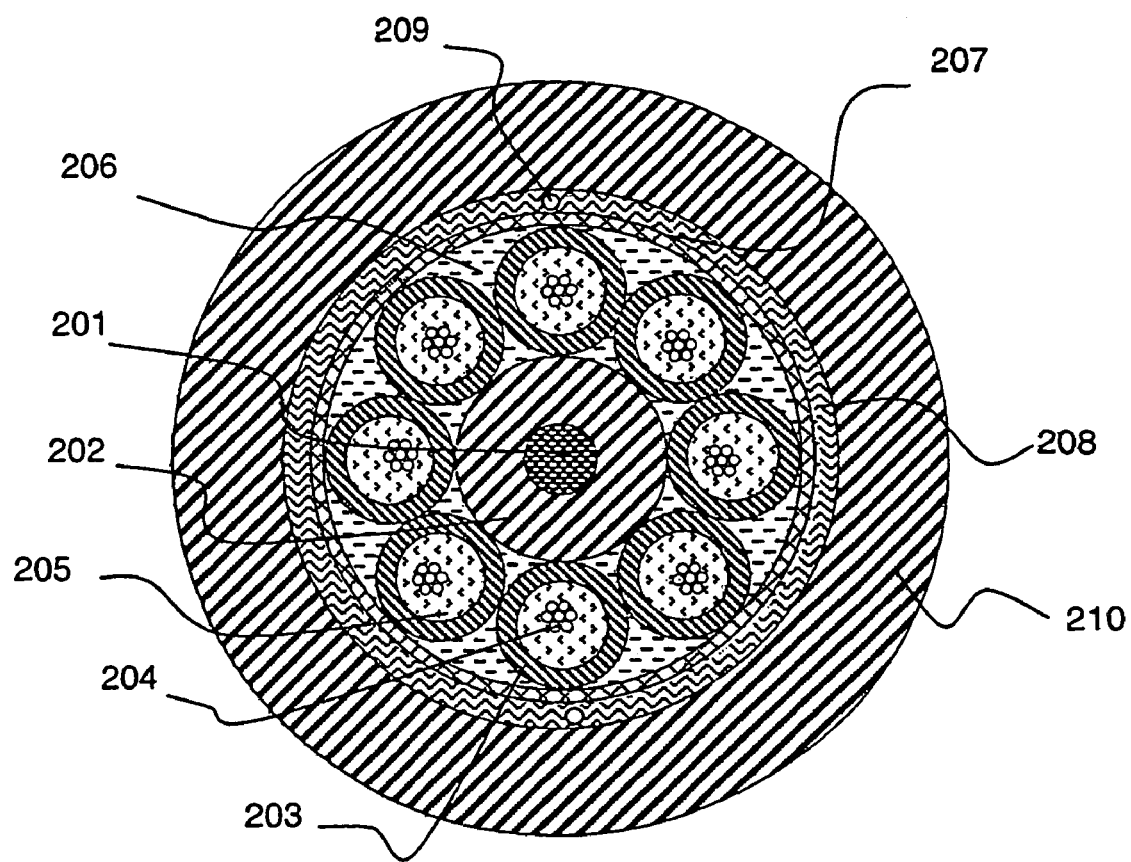
FIG. 2 is a cross-sectional view of an alternative embodiment of a cable according to the invention.

FIG. 2 shows an alternative embodiment of a cable according to the invention, in particular of a terrestrial cable. The cable shown in FIG. 2 has in its radially innermost position a reinforcing element (201), typically made from glass-fibre reinforced plastic, coated with a layer (202) of polymeric material, for instance a polyolefin. The cable has one or more polymeric buffer tubes (203) according to the invention, said tubes comprising a number of optical fibers (204), which are embedded in a filling material (205).

The optical fiber can be, for example, multi-mode fibers, single-mode fibers, such as standard single-mode fibers, dispersion-shifted (DS) fibers, non-zero dispersion (NZD) fibers, or fibers with a large effective area and the like, depending on the application requirements of the cable. Combinations of the above fibers in different sections and/or tubes of the cable can also be used.

Examples of filling compositions suitable for being used as water-blocking filler inside the above buffer tubes are those mentioned previously with respect to the buffer tube of FIG. 1.

The number of buffer tubes (203) present in the cable (which may also be arranged on several superposed layers) and the dimensions of these tubular elements depend on the intended capacity of the cable, as well as on the conditions under which this cable will be used. For example, six, eight or more tubular elements, arranged in one or more layers (for example up to 48 tubes), can be disposed around the central element.

The buffer tubes (203) are disposed in a helical lay around the central member, said lay being either a continuous helix or preferably an open helix obtained by alternate (S-Z) stranding of the tube. If desired, one or more tubes may be replaced by one or more rods, in order to preserve the symmetry of the helical configuration in case the fiber count is lower than the full fiber count. Alternatively, the central element can be replaced by a further tubular element as those previously mentioned, apt to contain optical fibers.

The interstices (206) among the buffer tubes can also be filled with a filling compositions such as those previously mentioned, said compositions having preferably a higher viscosity. For further improving the water blocking properties of said filling material, a water swellable powder (i.e. a compound having the property of gelling/swelling upon water absorption), such as sodium polyacrylate or polymethacrylate, can be advantageously added to the jelly-like composition as disclosed, for example, in U.S. Pat. No. 5,715,343.

Stranded tubes are generally bound together with a polymeric yarn or tape (not shown), e.g. a polyester or polypropylene yarn, in order to held them firmly in their helical configuration during manufacturing processes.

A further polymeric tape (not shown), for instance of polyester (e.g. Mylar®), can be optionally wound with overlapping around, the stranded buffer tubes in order to allow an effective containment of the interstitial water-blocking filler. A water-blocking (or water swellable) tape (207) can be wound around the whole structure. Such water-blocking tapes generally comprise a polymeric base tape on the surface of which a superabsorbent swellable material (e.g. polyacrylate or polymethylmethacrylate) in the form of powder is chemically or thermally fixed. Examples of suitable water-swellable tapes are those commercialized by Freudenberg under the trademark Viledon®, e.g. Viledon® K3415, K3416, K3417 or K3516.

The stranded tubes can then be wrapped by a reinforcing layer (208), e.g. made of aramidic yarns (Kevlar®) or glass thread, optionally containing two sheath cutting threads (209) disposed longitudinally with respect to the cable. An outer polymeric layer, e.g. of polyolefin (for instance as above defined for the component according to the present invention), is then disposed to surround the cable structure. Optionally, a metal tape (not shown), preferably corrugated, can be disposed between the outer sheath (210) and the reinforcing layer.

Although a cable component according to the invention has been illustrated with specific reference to the buffer tubes of the cable of FIGS. 1 and 2, it will be understood that any optical cable component as herein defined can be made of and manufactured with the polymeric material as above defined, which can be therefore used for cable components such as slotted cores containing optical fibers, polymeric tapes, e.g. for wrapping a plurality of buffer tubes, or jackets disposed to surround inner radial portions (e.g. a group of buffer tubes) of an optical cable.

The following examples illustrate the invention more in detail.

EXAMPLES

Six different compositions, made of either a polymeric material alone or also including a nucleating agent, were prepared and are illustrated in the following table where all amounts are expressed as weight phr (per hundred of resin) on the total weight of the composition.

TABLE 1

|  | E. 1* | E. 2* | E. 3* | E. 4 | E. 5 | E. 6 |
| --- | --- | --- | --- | --- | --- | --- |
| Finapro 4660G | 100 | 100 | 100 |  |  |  |
| Clyrell 831 RCXP |  |  |  | 100 | 100 |  |
| Moplen Ultra 925 RCXP |  |  |  |  |  | 100 |
| Talc 1N-M20 |  | 0.3 |  | 0.3 |  |  |
| Millad 3988 |  |  | 0.3 |  | 0.3 | 0.3 |

E. = Example;
*= comparison

Finapro 4660G—a crystalline "heterophasic" propylene/ethylene copolymer, produced by Fina Chemicals, consisting of about 85% linear polypropylene and 15% ethylene-propylene rubber. Melt Index (MI) measured at 230° C. and 2.16 kg is 3.5 g/10 min.

Clyrell 831 RCXP—a crystalline propylene-butene random copolymer comprising about 5.2% butene, produced by Montell, MI=1.8 g/10 min at 230° C. and 2.16 kg.

Moplen Ultra 925 RCXP—a crystalline propylene-butene random copolymer, comprising about 7.1% butene and an antigas-fading phenolic stabilizer, produced by Montell, MI=10 g/10 min at 230° C. and 2.16 kg.

Talc 1N-M20 from Val Chisone—a talc, showing 98% of its particles having dimensions lower than 20 μm, commercially available from Luzenac.

Millad 3988—3,4-di(methylbenzylidene) sorbitol; a fully organic nucleating agent produced by Milliken Chemicals.

The compositions of the examples 2 to 6 were obtained by mixing the polymer material with the powdered nucleating agent in a 20 mm double-screw Brabender at a temperature of about 190° C. to complete homogenization. The material left the double-screw mixer in the form of granules.

The compositions of Examples 1-6 were then used to feed a 30 mm strainer and obtain an extruded tube with an outer diameter of 3.5 mm, an inner diameter of 2.0 mm and a minimum and maximum thickness of 0.2 and 1.1 mm, respectively, according to the buffer tube exemplified with reference to FIG. 1. In comparative examples 1-3, the melt temperature at the head outlet was 210° C. whereas it was about 20° C. lower in the case of examples 4 to 6.

The ability to maintain the shape was measured and is expressed by two parameters: a Shape Index, which is an integer number in a scale from 1 to 10 corresponding to the % ovalization of the tube (as reported in the following table 2), and the depression (mm Hg). of the applied vacuum necessary to maintain the correct shape.

The higher the index is, the better the buffer tube geometry, whereas the higher the depression is, the worse the polyolefin material performance.

The following table shows the correlation between the shape index value and the observed percentage of ovalization of the tube, wherein the percentage of ovalization is expressed as percentage difference between the maximum and the minimum measured outer diameter of the extruded tube.

TABLE 2

| Shape index (SI) | Percentage ovalization (po) |
|---|---|
| 10 | po ≤ 0.5 |
| 9 | 0.5 < po ≤ 1.75 |
| 8 | 1.75 < po ≤ 3.0 |
| 7 | 3.0 < po ≤ 4.25 |
| 6 | 4.25 < po ≤ 5.5 |
| 5 | 5.5 < po ≤ 6.75 |
| 4 | 6.75 < po ≤ 8.0 |
| 3 | 8.0 < po ≤ 9.25 |
| 2 | 9.25 < po ≤ 10.5 |
| 1 | po > 10.5 |

The results of the extrusion tests and the measures subsequently carried out are reported in the following table 3.

TABLE 3

| | SI/D | T | Mp |
|---|---|---|---|
| E. 1* | 3/500 | 53-63 | 165 |
| E. 2* | 8/200 | 49-66 | 165 |
| E. 3* | 9/200 | 52-65 | 165 |
| E. 4 | 9/200 | 80-87 | 151 |
| E. 5 | 10/100 | 80-87 | 151 |
| E. 6 | 10/150 | 76-86 | 148 |

SI/D = Shape Index (arbitrary units)/Depression (mmHg);
E. = Example;
*= comparison;
T = transparency (transmittance, %);
mp = melting point (° C.).

It is evident from the above table that a standard propylene-ethylene copolymer as Finapro 4660G without the addition of a nucleating agent, is unsuitable since it shows a shape index of 3 with an applied depression 500 mmHg. The same material when added with talc as nucleating agent (ex. 2) shows a shape index of 8 with an applied depression of 200 mmHg. On the contrary, the buffer tube made from a material according to the invention, when added with talc (Ex. 4) shows a shape index of 9 with the same applied depression.

Finally, the standard propylene-ethylene copolymer Finapro 4660G material, when added with a sorbitol derivative as nucleating agent (Ex. 3), shows a shape index of 9 with an applied depression of 200 mmHg. The buffer tubes of the invention, comprising the above defined polymer material, when added with the same nucleating agent (Ex. 5 and 6), show instead a shape index of 10 with an even reduced applied depression of 100 and 150 mmHg respectively.

An improvement can thus be evidently observed by using the polypropylene copolymer above defined as material suitable for the buffer tubes of the invention, which guarantees the obtainment and keeping of the desired shape.

Further, the polymer material suitable for the invention shows a very good transparency adversely from heterophase propylene-ethylene copolymers and regardless of the added nucleating agent. Transparency was determined by measuring the transmittance of a ray of light in the visible spectrum (400-700 nm) through a 1 mm thick material sample using an UV visible spectrophotometer Varian, mod. CARY3E.

The melting points were measured by Mettler DSC instrumentation (second melting value) with a scanning rate of 10° C./min (instrument head type DSC 30, microprocessor type PC 11, Mettler software Graphware TA72AT.1); the relevant values evidently show how the compositions of the invention allow to use lower process temperatures.

The invention claimed is:

1. An optical fiber cable comprising a cable component, wherein the cable component is made of a polymeric material comprising a crystalline random copolymer derived from monomers selected from the group consisting of propylene and $C_4$-$C_8$ α-olefin monomers, wherein said crystalline random copolymer is derived from propylene with at least one $C_4$-$C_8$ α-olefin.

2. The optical fiber cable according to claim 1, wherein the cable component is a buffer tube defined by a peripheral polymeric wall and containing at least one optical fiber housed therein.

3. The optical fiber cable according to claim 2, wherein a longitudinal reinforcing element is embedded in the peripheral wall of the buffer tube.

4. The optical fiber cable according to claim 1, wherein the cable component is substantially made of the copolymer.

5. The optical fiber cable according to claim 1, wherein the at least one $C_4$-$C_8$ α-olefin is an olefin of the formula $CH_2$=CH—R, where R is a linear or branched alkyl containing 2 to 6 carbon atoms.

6. The optical fiber cable according to claim 1, wherein the at least one $C_4$-$C_8$ α-olefin is selected from 1-butene, 1-pentene, 3-methyl-1-butene, 4-methyl-1-pentene, 1-hexene, 3,4-dimethyl-1-butene, 1-octene or a mixture thereof.

7. The optical fiber cable according to claim 1, wherein the at least one $C_4$-$C_8$ α-olefin is 1-butene.

8. The optical fiber cable according to claim 1, wherein the copolymer contains from about 1 to about 12 weight percent of the at least one $C_4$-$C_8$ α-olefin, with respect to the total weight of the copolymer.

9. The optical fiber cable according to claim 1, wherein the copolymer contains from about 4 to about 10 weight percent of the at least one $C_4$-$C_8$ α-olefin, with respect to the total weight of the copolymer.

10. The optical fiber cable according to claim 1, wherein the copolymer has a melting point of from about 140° C. to about 156° C.

11. The optical fiber cable according to claim 1, wherein the copolymer has a crystallization point from about 90° C. to 120° C.

12. The optical fiber cable according to claim 1, wherein the copolymer has a content of fractions insoluble in xylene at 25° C. higher than about 93%.

13. The optical fiber cable according to claim 12, wherein the copolymer has a content of fractions insoluble in xylene at 25° C. higher than about 95%.

14. The optical fiber cable according to claim 1, wherein the copolymer has a Melt Flow Index (MFI) in the range from 1 to 15 g/10 min. measured at 190° C. (ASTM 1238).

15. The optical fiber cable according to claim 1, wherein the copolymer has a Melt Flow Index (MFI) in the range from 1 to 10 g/10 min. measured at 190° C. (ASTM 1238).

16. The optical fiber cable according to claim 1, wherein the polymeric material has a flexural modulus (method ISO 178) of at least about 500 MPa.

17. The optical fiber cable according to claim 1, wherein the polymeric material has a flexural modulus (method ISO 178) in the range of about 800 to 1500 MPa.

18. The optical fiber cable according to claim 1, wherein the transmittance of the polymeric material is above 70%.

19. The optical fiber cable according to claim 1, wherein the transmittance of the polymeric material is above 80%.

20. The optical fiber cable according to claim 1, wherein the copolymer is in admixture with at least a second olefin polymer.

21. The optical fiber cable according to claim 20, wherein the second olefin polymer is selected from a propylene homopolymer or a crystalline propylene copolymer containing from 1% to 3% by weight of ethylene.

22. The optical fiber cable according to claim 20, wherein the amount of the second olefin polymer is in the range of from about 10% to about 40%, with respect to the total weight of said crystalline random copolymer derived from propylene and $C_4$-$C_8$ α-olefin monomers.

23. The optical fiber cable according to claim 20, wherein the amount of the second olefin polymer is in the range of from about 10% to about 30%, with respect to the total weight of said crystalline random copolymer derived from propylene and $C_4$-$C_8$ α-olefin monomers.

24. The optical fiber cable according to claim 1, wherein a nucleating agent is disbursed into the polymeric material.

25. The optical fiber cable according to claim 24 wherein the nucleating agent is in the range of 0.05% to 1% by weight, with respect to the total weight of the copolymer.

26. The optical fiber cable according to claim 24, wherein the nucleating agent is in the range of 0.1% to 0.5% by weight, with respect to the total weight of the copolymer.

27. The optical fiber cable according to claim 24, wherein the nucleating agent is selected from inorganic materials, D-sorbitol derivatives, salts of aliphatic monobasic or dibasic acids, aralkyl acids, or alkali metal or aluminum salts of aromatic or alicyclic carboxylic acids, talc, or a mixture thereof.

28. The optical fiber cable according to claim 24, wherein the nucleating agent is a D-sorbitol derivative of the following formula:

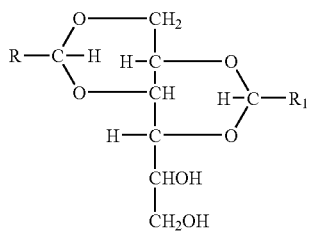

wherein R and $R_1$ are independently a

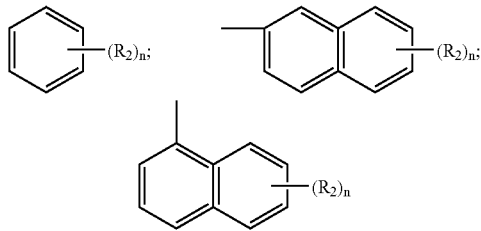

group, wherein $R_2$ represents a $C_1$-$C_6$ alkyl or alkoxy group and n is 1, 2 or 3.

29. The optical fiber cable according to the claim 28, wherein R and $R_1$ are a

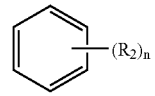

group, $R_2$ being a $C_1$-$C_6$ alkyl group and n being 1, 2 or 3.

30. An optical fiber cable component comprising a polymeric material comprising a crystalline random copolymer derived from monomers selected from the group consisting of propylene and $C_4$-$C_8$ α-olefin monomers, wherein said crystalline random copolymer is derived from propylene with at least one $C_4$-$C_8$ α-olefin.

31. An optical fiber cable component according to claim 30, which is a buffer tube.

\* \* \* \* \*